April 21, 1953        A. BUCHI        2,635,849
TURBINE STAGE
Filed July 31, 1947        3 Sheets-Sheet 1
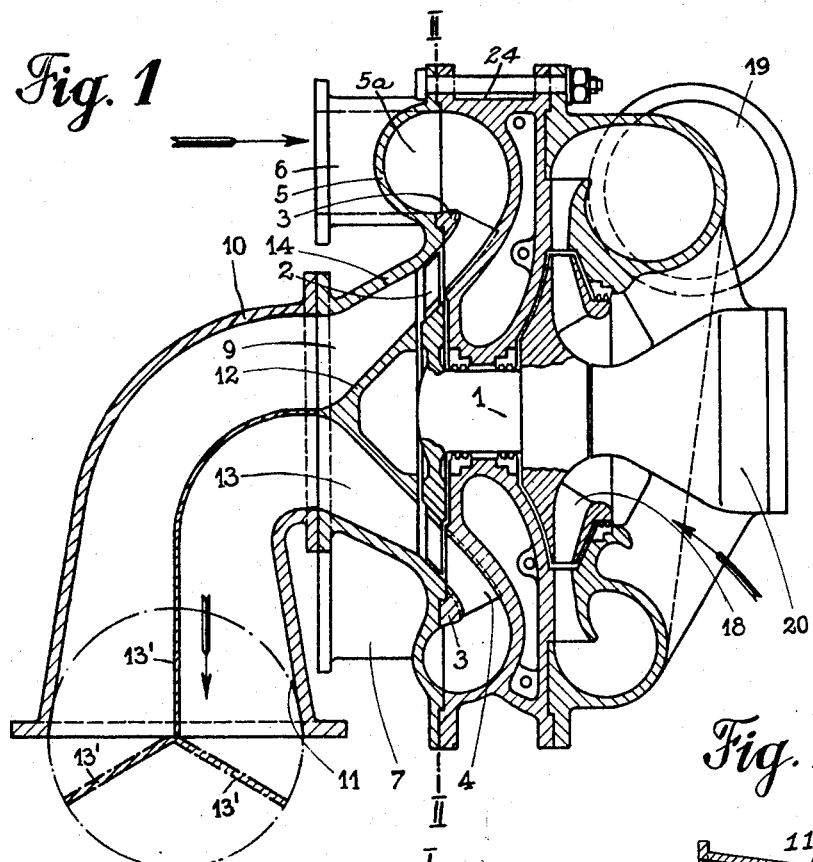
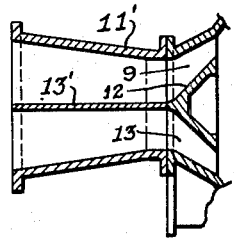
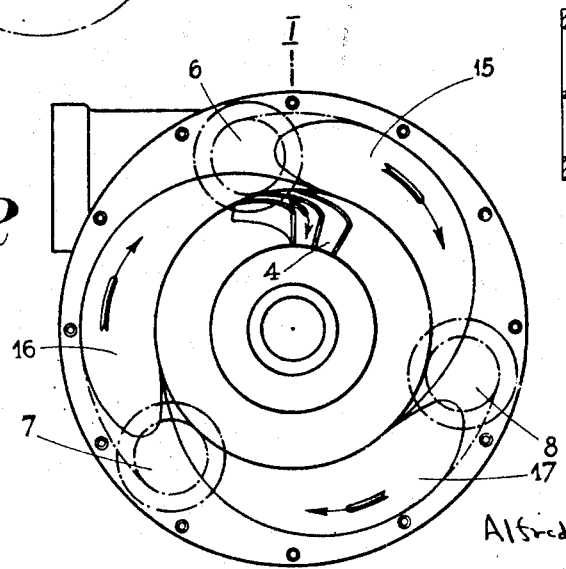
Inventor
Alfred Buchi April 21, 1953          A. BUCHI          2,635,849
TURBINE STAGE
Filed July 31, 1947          3 Sheets-Sheet 2
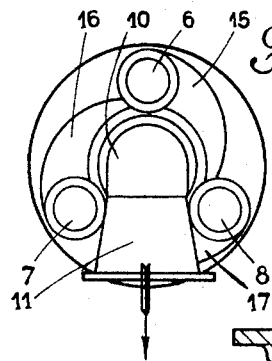
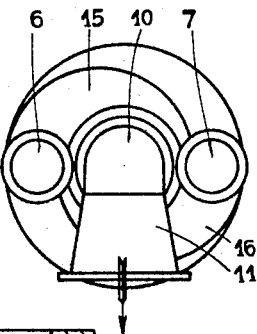
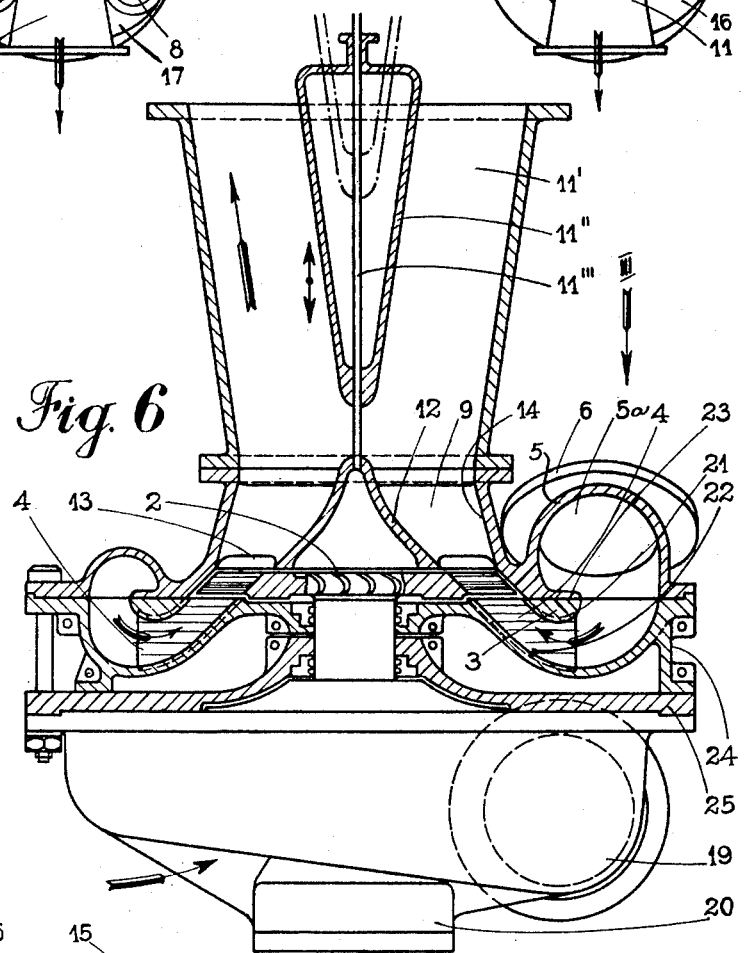
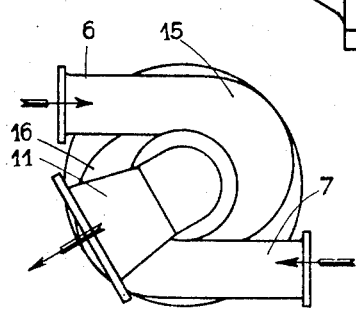

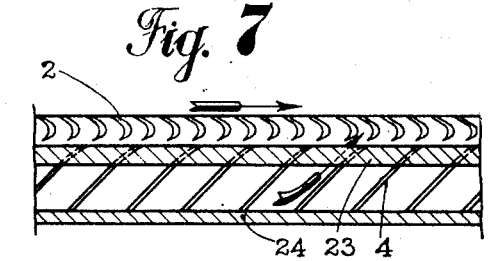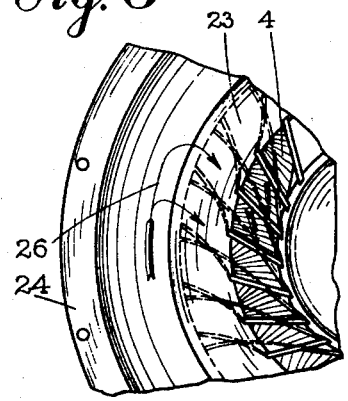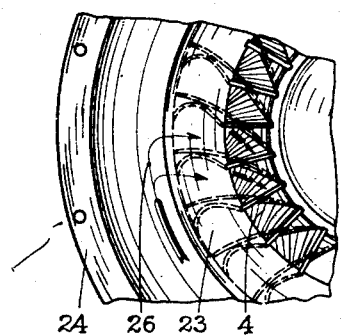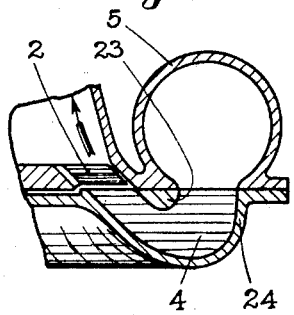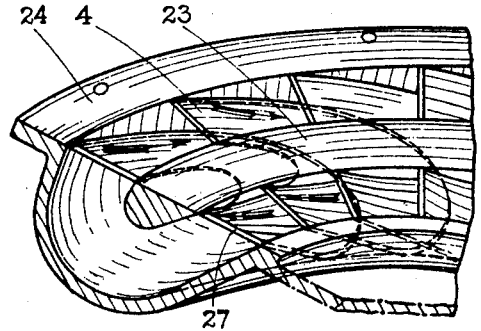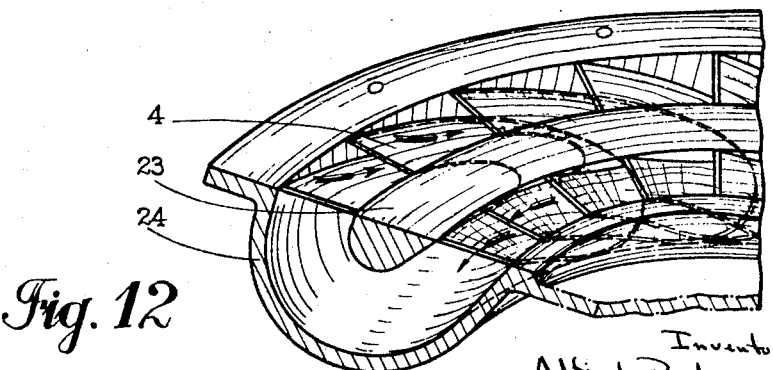

Patented Apr. 21, 1953

2,635,849

UNITED STATES PATENT OFFICE 2,635,849

TURBINE STAGE

Alfred Buchi, Winterthur, Switzerland

Application July 31, 1947, Serial No. 765,217
In Switzerland August 13, 1946

10 Claims. (Cl. 253—40)

This invention relates to a special form of turbine stage with adjacent diffuser, particularly for gas turbines. In my present invention the guide vanes and the turbine walls before and after the rotor wheel are so formed and erected that the pressure medium flows through the rotor blading in radial-axial direction, inclined towards the turbine axis, and the adjacent diffuser has, at least in the vicinity of the rotor blading, inner and outer divergent walls, whereby both walls are symmetrical to the turbine axis.

In addition, I may so construct my turbine that the admission of the pressure medium to the rotor blading is effected from a space outside of the rotor blading through guide vanes which are practically flat, arranged crosswise to the turbine axis, and approximately in the direction of the absolute entrance velocity of the pressure medium into the rotor blading.

The deflection of flow of the pressure medium into the axial-radial flow direction of the rotor blading can be thus effected by the side walls of the guide vane casing which are predominantly radially directed and which have relatively large radii of curvature. The inlet casing for the pressure medium, which may have at least one duct, may be arranged at least partly radially outside of the rotor blading. The guide vanes, which are nearly flat and which are set askew to the turbine axis, may reach up to this inlet casing which extends radially outside of the rotor blading. The pressure medium may have a tangential direction of flow in the latter, and the guide vanes may be directed so that the pressure medium flows to the guide vanes without shock losses. In this way the direction of admission of the pressure medium in the entrance casing is made opposite to the sense of rotation of the turbine.

Adjacent to the conical-walled diffuser there may be a curved diffuser or a curved tubular pipe section with approximately constant cross sectional flow area. The pressure medium may afterward flow into a further diffuser with straight axis. The rotor blading may be formed so that the pressure medium assumes, upon leaving the same, an axial direction (parallel to turbine axis), or so that the pressure medium leaves the rotor blading in a direction which has, at least on the outer circumference, a tangential component. The turbine inlet casing and the exit diffuser may be manufactured in one piece. In case of turbines where several separate streams of pressure medium are fed to the turbine through conduits separated up to the guide vanes by division walls, corresponding division walls may also be arranged in the adjacent diffuser.

The advantages of the structure of this invention lies in the fact that a single turbine stage can thus handle large pressure ratios and with good efficiency. Compared to axial turbines, a turbine according to this invention has longer passages for the pressure medium in the rotor blading and in the guide vanes. This affords a larger radius of curvature for the flow of the pressure medium, causing lower deflection losses. On the other hand, higher gas velocities can be accommodated without excessive losses. In case of higher relative velocities of the pressure medium, the rotor blading flow areas become slightly smaller, and so do the blade dimensions, a very important advantage with turbines operated by hot gases. Also, larger inlet and/or exit angles can be used in the rotor blading, which further reduces the deflection losses. A turbine according to this invention has also the great advantage, especially for gas turbines, that the temperatures of the pressure medium passing through the rotor are lower than they would be on turbines without adjacent diffuser. The design with overhung turbine rotor permits a central discharge of the pressure medium and similar transmission in the diffuser. The almost flat guide vanes make a guide apparatus with practically no deflection losses and they assure proper guiding of the pressure medium to the rotor wheel.

My present invention enables the turbine inlet casing to be disposed on the outside of the turbine stage but with a smaller outer diameter of the casing than is possible with other designs, and at the same time, affords a relatively high entrance velocity of the pressure medium.

If the guide apparatus between the turbine inlet casing and rotor is substantially U-shaped, as viewed in a radial section, and is equipped with nearly flat vanes, set crosswise to the turbine axis, the turbine can be arranged to have a sense of rotation opposite to the tangential entrance velocity in the turbine inlet casing. This has certain advantages in some cases where a certain sense of rotation of the turbine and of the driven machine opposite to the direction of flow of the pressure medium of the turbine is desired.

The present invention may be used on single-stage or multi-stage turbines and in the latter, only on the last stage. It is also applicable to turbines consisting of several groups of stages, The invention may be used regardless of whether the turbine rotors are supported by bearings on both ends or in case of overhung construction; although it has particularly useful application in the latter type of turbine.

My invention is further described in this specification and is illustrated in the accompanying drawings in which:

Fig. 1 shows a special embodiment of the invention in axial section according to line I—I of Fig. 2, and Fig. 2 is a view according to line II—II of Fig. 1.

Fig. 1a represents a partial axial section of the turbine of Fig. 1 in which the outlet diffuser 11' is directed axially instead of being turned to discharge downwardly as is the diffuser 11 in Fig. 1.

Figs. 3, 4 and 5 show outside views of various embodiments, seen from the turbine inlet side.

Fig. 6 shows a partial axial section through a further embodiment, and Fig. 7 shows (rolled up) a development of guide vane and rotor blading for a turbine according to Fig. 6.

Figs. 8–12 illustrate specifically different embodiments of rotor wheels of a turbine according to this invention, in sectional view, and in axonometric view, respectively.

In Figs. 1 and 2, 1 is the turbine wheel and 2 are the rotor blades attached thereto. According to this invention these rotor blades 2 give radial-axial flow direction, inclined towards the turbine axis, so that the turbine exit points in a direction opposite to the rotation of the driven machine. 3 is a guide apparatus which may be equipped with vanes 4. 5 is the turbine inlet casing with inlet ducts 6, 7 and 8 which, on this example, are shown axially directed. 5a is the gas receiving space in inlet casing 5. 9 is the diffuser arranged adjacent to rotor wheel 2 and which has inner and outer walls formed by cones 12 and 14; the axis of symmetry of these cones being in the turbine axis. 10 is a curved tubular section adjacent to diffuser 9 with approximately constant cross section, and 11 is the exit diffuser. The inner limitation of diffuser 9 is formed by a conical body 12 which is attached to the outer diffuser walls 14 through walls 13. If, for instance, three separate turbine entrances 6, 7 and 8, as shown, exist, then the admission of the pressure medium to guide vanes 4 is effected by three spirally arranged, separate spaces 15, 16 and 17, and after the turbine wheel 1 a corresponding division may also be effected through three walls 13 as shown. These walls 13 begin in the diffuser 9 and may extend in the form of division walls 13' up to the end of the exit diffuser 11 so that three streams of pressure medium flow separately through the whole turbine casing from entrance to exit. The exit diffuser 11' may also, as shown in Fig. 1a, extend directly and coaxially behind the diffuser 9 behind the rotor wheel.

In the example shown in Fig. 1 the turbine is driving a blower impeller 18 which feeds its pressure medium into a collecting casing 19. The turbine rotor 1 and the blower impeller 18 are rotatably supported by the bearing support 20.

In Fig. 3 there is illustrated an outside view of a turbine according to Fig. 1. 6, 7 and 8 are the inlet ducts, 15, 16 and 17 are the spirally formed admission ducts to the guide apparatus, 10 is the elbow behind the first diffuser 9, and 11 is the exit diffuser which is carried radially to the outside between inlet ducts 7 and 8.

Fig. 4 is a similar view of a turbine according to the invention with two axially directed pressure medium inlets 6 and 7 and two admission spirals 15 and 16. 10 is the elbow, and 11 the diffuser before the exit of the pressure medium.

Fig. 5 shows a view of a turbine with two tangential inlets 6 and 7 of the pressure medium and with two inlet spirals 15 and 16. The exit diffuser 11 is shown in inclined position in this embodiment.

Figs. 6 and 7 show an embodiment of the invention whereby guide vanes 4 are designed as nearly flat surfaces, set askew to the turbine axis, and directed so that they impart the proper absolute inlet flow direction at the entrance to the turbine wheel. This is illustrated more clearly in Fig. 7. The change of flow direction of the pressure medium coming from space 5a outside of the rotor wheel is effected through the gradually curved walls 21 and 22 of the casing walls 23 and 24 adjacent to the turbine entrance. By this design the losses through the change of direction in the guide apparatus will remain small, and the proper direction of the flow entering the rotor wheel is assured by guide vanes. The vanes 4 may be fitted or cast into the casing parts 23 and/or 24. They may also be attached to one wall only and butt against the other. The annular bulge 23 may be made as a separate piece or it may be manufactured integrally with one part of the inlet casing. The casing part 24 may also be formed as a separate piece, as shown in Fig. 6, or it may be built integrally with parts 25. Parts 24 and 25 may be split, for instance in a plane through the turbine axis.

The vertically arranged turbine according to Fig. 6 contains only a single admission 6 for the pressure medium. The latter enters tangentially to the turbine axis and is fed through a spirally shaped casing 5 with gradually diminishing cross section to the whole circumference of guide apparatus 3. The guide vanes 4 have an axially directed limitation on the outside. They may also be made longer or shorter.

Diffuser 9 with its conical walls 12 and 14 and its support ribs 13 is followed by a coaxial diffuser 11'. In diffuser 11', for instance in its center, a movable filling piece 11'' may be arranged so that it can be displaced axially on a rod 11'''. This filling piece may have a conical outer shape. By varying the location of this filling piece, the amount of cross sectional area for the flow of pressure medium can be varied, and the effect of diffuser 11' can be thus altered. In this manner I can achieve the most favorable transition of velocity into pressure in diffuser 11' depending on the quantity of pressure medium flowing through the turbine. This is particularly important in the range of higher velocities of the pressure medium.

Fig. 8 shows an axial view of casing part 24 seen in the direction of the arrow on Figs. 1 and 6. The edges of the guide vanes 4 towards the entrance to the turbine rotor are visible. Behind the bulge 23, blades 4 are drawn in dotted lines. In this embodiment the entrance edges reach almost to the outer circumference of this bulge. The gas entry direction is shown by arrows 26. As visible on Fig. 8, the guide vanes 4 are set askew in relation to the radial direction.

Fig. 9 shows a similar view of the guide apparatus except that here the guide vanes 4 are directed radially at their exit towards the turbine rotor.

In Fig. 10 one embodiment of the guide vanes is shown in an axial section whereby the guide vanes 4 are ending in the same radial plane with their entrance as well as their exit. This plane is also a dividing plane between the casing parts 5 and 24.

Fig. 11 is an axonometric illustration of the guide apparatus according to Fig. 10. The flat vanes 4 are visible. They are U-shaped. The guide vanes are radially directed on their entrance as well as their exit edges. However, they could also be set askew to the radial direction. At the exit edge 27 these vanes have an entrance angle necessary for shock-free flow to the rotor wheel.

The exit angle can be, as illustrated in Fig. 12, more acute than the entrance angle. This is illustrated in Fig. 12 by shading.

I claim:

1. A turbine stage particularly adapted for use in gas turbines comprising in combination, a turbine rotor, said rotor having blading adapted to receive gases admitted in a direction axial-radial of the rotor, a gas inlet casing about said rotor, said casing including a guide blade casing portion, said portion being formed substantially of a pair of frustro-conical annular walls disposed apart from each other to form therebetween an annular space, the conical surfaces of said walls both having the rotor axis as the axis of symmetry, said walls further being directed to define said space from an area radially beyond the rotor blading down to the gas entrance edges of the rotor blading, guide blades disposed in said annular space to extend from one annular wall to the other to form a plurality of individual gas passages for the actuating medium within said space, each said guide blade being substantially flat, being placed in a plane inclined towards the rotor axis, and of such length as to result in the radii of curvature of said passages being appreciably greater than the radius of curvature of said annular space, and the discharge ends of said guide blades being further directed approximately to coincide with the direction of the absolute entrance velocity of the actuating medium into the rotor blading.

2. A turbine stage particularly adapted for use in gas turbines comprising, in combination, a turbine rotor, said rotor having blading adapted to receive gases admitted in a direction axial-radial of the rotor, a gas inlet casing arranged about said rotor, said casing forming at least one guide passage to admit motivating gases from without the casing and to conduct the same to the gas entrance edges of the rotor blading, the said inlet casing containing a guide blade section disposed to terminate adjacent the gas entrance edges of the rotor blading, said guide blade section being formed by walls having a gradual, large radius of curvature predominantly radially directed and said section including a plurality of separate ducts, said ducts being formed by a series of guide blades, each said guide blade being substantially flat, being disposed substantially in the direction of the absolute entrance velocity of the motivating gases to the turbine rotor blading, and lying substantially in a plane which is inclined to and intersects the rotor axis, whereby the motivating gases are directed diagonally axially radially into the turbine rotor blading, and said turbine blading being further disposed to pass the gases through said blading and to discharge them in a circular area about the rotor axis.

3. A turbine stage according to claim 2 in which the inlet casing is arranged at least partially outward of the turbine rotor blading.

4. A turbine stage according to claim 2 wherein the gas inlet casing defines a gas receiving space disposed between that part of the guide passage via which the motivating gases are admitted from without the casing and the guide blade section, wherein the guide blades extend radially as far as the said gas receiving space in such manner that the entrance and exit edges of the said guide blades lie in substantially the same substantially radial plane, wherein the motivating gases are admitted into the guide blade section in substantially tangential directions, thereby to minimize shock losses, and wherein the said guide blades and passages are so turned and bent that the direction of admission of the pressure fluid into said passage is opposite the direction of rotation of the turbine.

5. A turbine stage according to claim 2 wherein an annular diffuser is provided beginning immediately downstream of the rotor blading, said diffuser being at least initially coaxial with the turbine rotor.

6. A turbine stage according to claim 5 wherein the diffuser is defined on its inside by an inner guide wall consisting of the outer surface of a conical body, said body being coaxial with the rotor, having the periphery of its base coinciding with the bases of the rotor blading, and its apex on said axis removed from said rotor, and the diffuser is defined on the outside by the inner surface of a wall forming the frustrum of a larger cone also coaxial with the rotor, said wall being flared out in axial direction from the rotor blading relative to the surface of said conical body, the said diffuser thereby forming a passage adapted to continue the pressure fluid in approximately the same diagonal axial radial direction as the direction of entry to the rotor blading from the guide blade section.

7. A turbine stage according to claim 5 wherein the diffuser is defined on its inside by an inner guide wall consisting of the outer surface of a conical body, said body being coaxial with the rotor, having the periphery of its base coinciding with the bases of the rotor blading, and its apex on said axis removed from said rotor, and the diffuser is defined on the outside by the inner surface of a wall forming the frustrum of a larger cone also coaxial with the rotor, said wall being flared out in axial direction from the rotor blading relative to the surface of said conical body, the said diffuser thereby forming a passage adapted to continue the pressure fluid in approximately the same diagonal axial radial direction as the direction of entry to the rotor blading from the guide blade section, and in addition to and following said diffuser there is arranged a second diffuser part, said second diffuser part having a straight axis also substantially coaxial to the turbine axis.

8. A turbine stage according to claim 5 wherein the diffuser is defined on its inside by an inner guide wall consisting of the outer surface of a conical body, said body being coaxial with the rotor, having the periphery of its base coinciding with the bases of the rotor blading, and its apex on said axis removed from said rotor, and the diffuser is defined on the outside by the inner surface of a wall forming the frustrum of a larger cone also coaxial with the rotor, said wall being flared out in axial direction from the rotor blading relative to the surface of said conical body, the said diffuser thereby forming a passage adapted to continue the pressure fluid in approximately the same diagonal axial radial direction as the direction of entry to the rotor blading from the guide blade section, and in addition to and following said diffuser there is arranged a second diffuser part, said second diffuser part having a curved axis, at its entrance.

9. A turbine stage according to claim 5 wherein the diffuser is defined on its inside by an inner guide wall consisting of the outer surface of a conical body, said body being coaxial with the rotor, having the periphery of its base coinciding with the bases of the rotor blading, and its apex on said axis removed from said rotor, and the diffuser is defined on the outside by the inner surface of a wall forming the frustrum of a larger cone also coaxial with the rotor, said wall being flared out in axial direction from the rotor blading relative to the surface of said conical body, the said diffuser thereby forming a passage adapted to continue the pressure fluid in approximately the same diagonal axial radial direction as the direction of entry to the rotor blading from the guide blade section and in addition to and following said diffuser there is arranged a curved tubular duct with approximately constant through-flow section, and following said duct, a second diffuser having a substantially straight axis.

10. A turbine stage according to claim 5, wherein the gas inlet casing forms a plurality of said guide passages via which separate gas streams are admitted through the rotor blading and wherein division walls are arranged in the diffuser to continue the separation of the gas streams upon their exit from the rotor blading.

ALFRED BUCHI.

References Cited in the file of this patent

UNITED STATES PATENTS

| Number | Name | Date |
|---|---|---|
| 844,094 | Bretscher | Feb. 12, 1907 |
| 1,038,295 | Churchill-Shann | Sept. 10, 1912 |
| 1,276,154 | Zoelly | Aug. 20, 1918 |
| 1,526,814 | Warren | Feb. 17, 1925 |
| 1,950,776 | Biggs | Mar. 13, 1934 |
| 2,159,422 | Buchi | May 23, 1939 |
| 2,162,956 | Lysholm | June 20, 1939 |
| 2,357,527 | Lundquist | Sept. 5, 1944 |
| 2,364,189 | Buchi | Dec. 5, 1944 |
| 2,390,506 | Buchi | Dec. 11, 1945 |
| 2,391,786 | Kenney | Dec. 25, 1945 |
| 2,405,282 | Birmann | Aug. 6, 1946 |
| 2,429,990 | Burgess | Nov. 4, 1947 |
| 2,478,206 | Redding | Aug. 9, 1949 |
| 2,510,606 | Price | June 6, 1950 |

FOREIGN PATENTS

| Number | Country | Date |
|---|---|---|
| 116,512 | Germany | Dec. 31, 1900 |